US010989623B2

(12) United States Patent
Myers

(10) Patent No.: US 10,989,623 B2
(45) Date of Patent: Apr. 27, 2021

(54) LEAKING TANK TESTING DEVICE

(71) Applicant: Richard Myers, Provo, UT (US)

(72) Inventor: Richard Myers, Provo, UT (US)

( * ) Notice: Subject to any disclaimer, the term of this patent is extended or adjusted under 35 U.S.C. 154(b) by 116 days.

(21) Appl. No.: 16/570,576

(22) Filed: Sep. 13, 2019

(65) Prior Publication Data
US 2021/0080342 A1 Mar. 18, 2021

(51) Int. Cl.
G01M 3/32 (2006.01)
(52) U.S. Cl.
CPC .......... G01M 3/329 (2013.01); G01M 3/3209 (2013.01)
(58) Field of Classification Search
CPC ....................... G01M 3/329; G01M 3/3209
See application file for complete search history.

(56) References Cited

U.S. PATENT DOCUMENTS

| 6,564,614 | B1 * | 5/2003 | Doris | .................. | G01M 3/26 |
| | | | | | 73/49.2 |
| 2001/0037829 | A1 * | 11/2001 | Shaw | .................. | G01L 19/0015 |
| | | | | | 137/315.01 |
| 2006/0179922 | A1 * | 8/2006 | Sacca | .................. | G01M 3/3218 |
| | | | | | 73/49.2 |
| 2019/0003917 | A1 * | 1/2019 | Goebel | ............... | G01M 3/3263 |
| 2019/0277453 | A1 * | 9/2019 | Ogiwara | .......... | B60K 15/03006 |

* cited by examiner

Primary Examiner — David Z Huang
(74) Attorney, Agent, or Firm — The Iwashko Law Firm, PLLC; Lev Ivan Gabriel Iwashko

(57) ABSTRACT

A leaking tank testing device, including a main body, a tubing system disposed within at least a portion of the main body to receive contents therein from a tank container, a selector rotatably disposed on an outer surface of the main body to select a vacuum testing mode in a first position, and a pressure testing mode in a second position, a vacuum monitor disposed on at least a portion of the main body to display a gradient in pressure between the contents in the tubing system and an external pressure outside of the main body in response to the selector being moved to the vacuum testing mode, and a seal disposed on at least a portion of the main body to cover at least a portion of the tubing system in response to the selector being moved to the pressure testing mode.

6 Claims, 3 Drawing Sheets

LEAKING TANK TESTING DEVICE

BACKGROUND

1. Field

The present general inventive concept relates generally to a testing device, and particularly, to a leaking tank testing device.

2. Description of the Related Art

A tank container is a type of container often used to store a gas or a liquid. Unfortunately, portions of the tank may deteriorate over time from wear and tear, which poses a risk of danger to people, animals, and other objects around the tank due to leakage.

Traditional methods of checking a tank for gas leaks and/or liquid leaks typically require an extended process, which can make testing unconventional containers a difficult undertaking. The traditional testing process can be problematic for people who do not have a suitable way of checking for these leaks, as the loss of gas and/or liquid can be extremely costly and dangerous.

Therefore, there is a need for a leaking tank testing device that can test for leaks of a tank container.

SUMMARY

The present general inventive concept provides a leaking tank testing device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a leaking tank testing device, including a main body, a tubing system disposed within at least a portion of the main body to receive contents therein from a tank container, a selector rotatably disposed on an outer surface of the main body to select a vacuum testing mode in a first position, and a pressure testing mode in a second position, a vacuum monitor disposed on at least a portion of the main body to display a gradient in pressure between the contents in the tubing system and an external pressure outside of the main body in response to the selector being moved to the vacuum testing mode, and a seal disposed on at least a portion of the main body to cover at least a portion of the tubing system in response to the selector being moved to the pressure testing mode.

The main body may include an air pressure regulator to reduce pressure from the contents, and a meter to display a current pressure level of at least one of the vacuum testing mode and the pressure testing mode.

The selector may include a detent to prevent automatic rotation of the selector.

The leaking tank testing device may further include a check valve to prevent the contents from flowing in opposite directions.

The leaking tank testing device may further include a hose quick connector disposed on a first end of the main body to connect to a hose from the tank container.

The leaking tank testing device may further include an air pressure quick connector disposed on a second end of the main body to receive a safety coupler thereupon to reduce pressure buildup within the tubing system.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
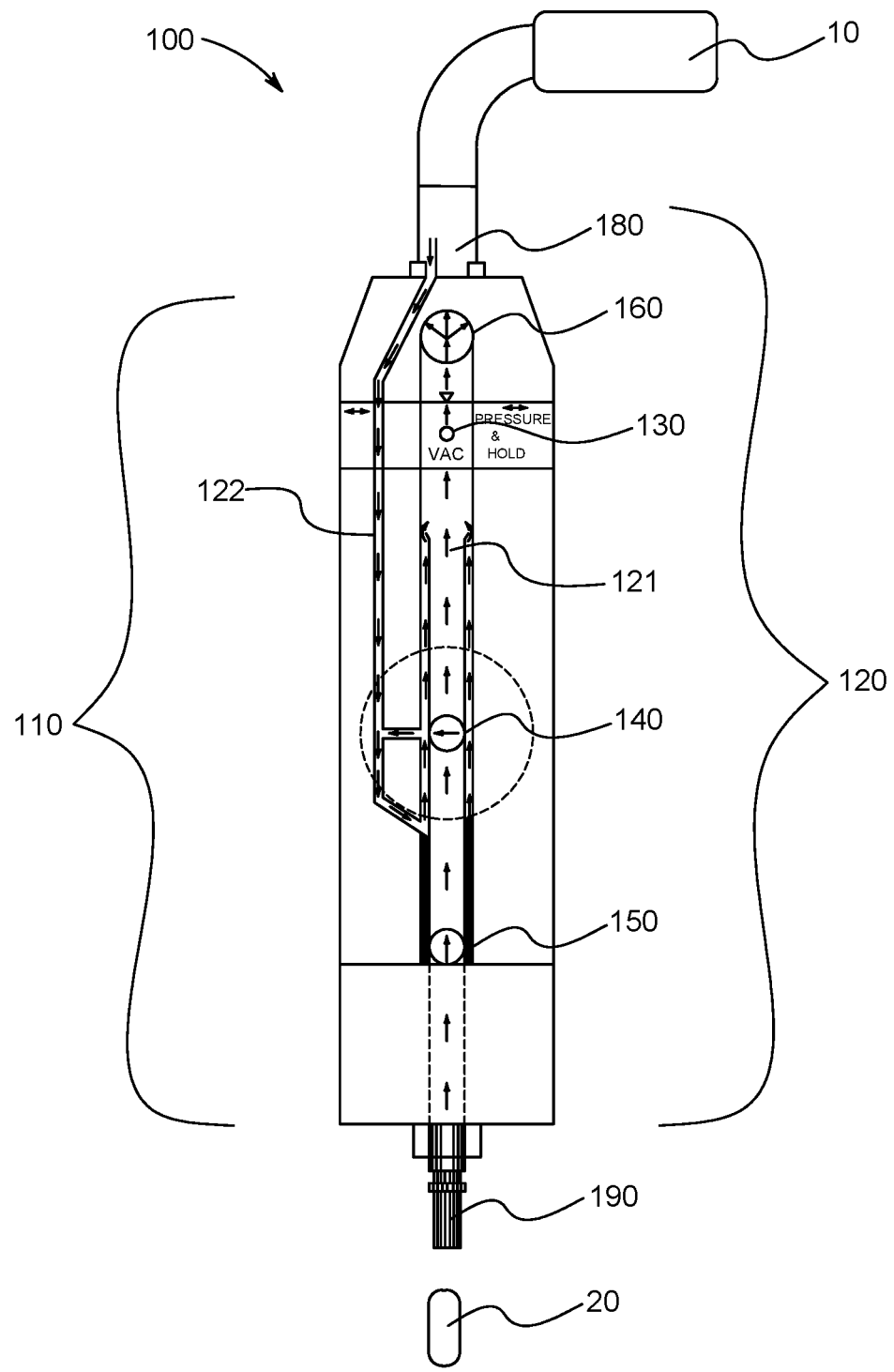
FIG. 1A illustrates a front sectional view of a leaking tank testing device in a vacuum testing mode, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Leaking Tank Testing Device 100
Main Body 110
Air Pressure Regulator 111
Meter 112
Tubing System 120
Main Tube 121
Intake Tube 122
Selector 130
Gauge Port 140
Check Valve 150
Vacuum Monitor 160
Seal 170
Hose Quick Connector 180
Air Pressure Quick Connector 190

FIG. 1A illustrates a front sectional view of a leaking tank testing device 100 in a vacuum testing mode, according to an exemplary embodiment of the present general inventive concept.

Figure 1B:
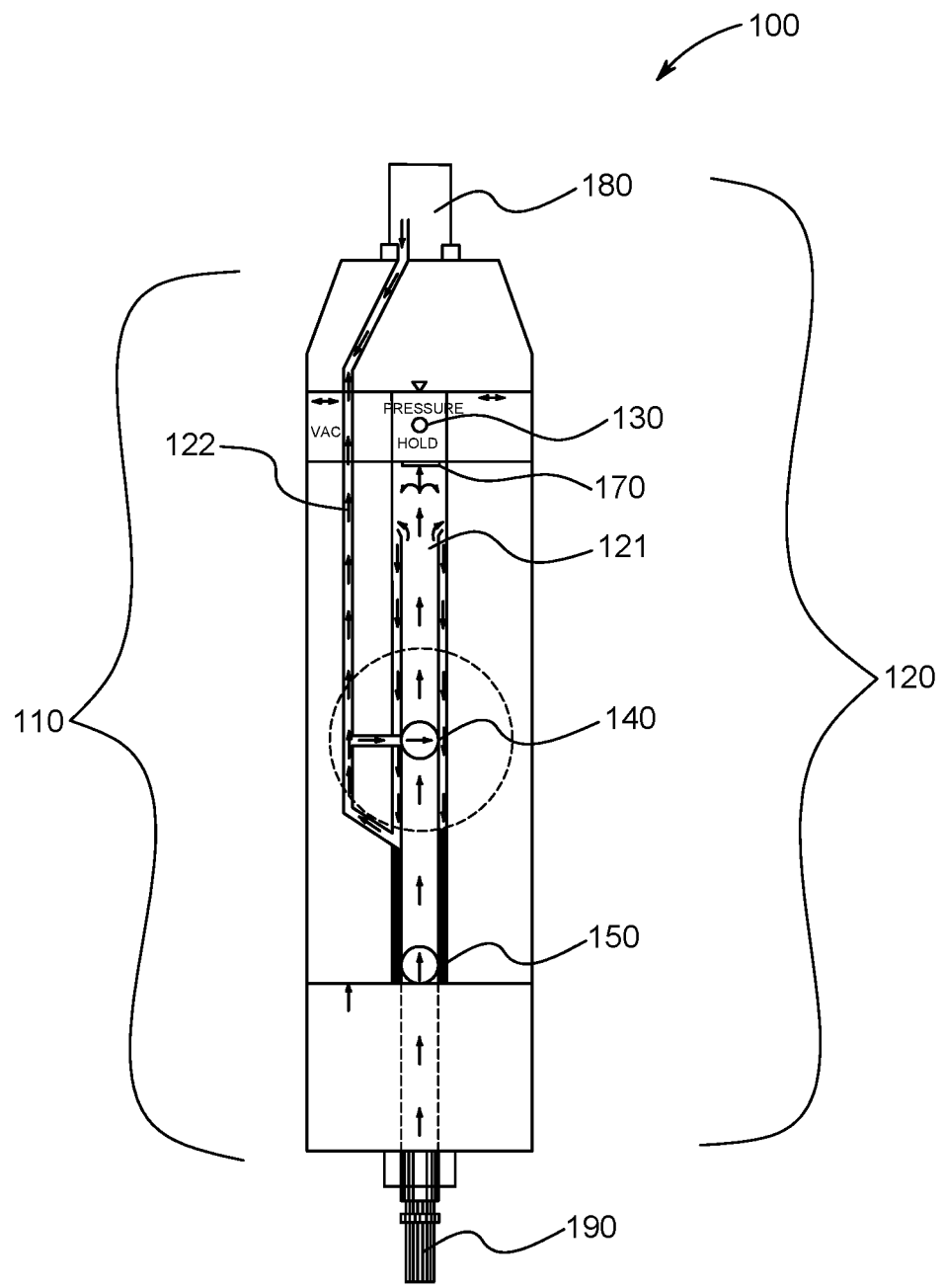
FIG. 1B illustrates a front sectional view of the leaking tank testing device in a pressure testing mode, according to an exemplary embodiment of the present general inventive concept.

FIG. 1B illustrates a front sectional view of the leaking tank testing device 100 in a pressure testing mode, according to an exemplary embodiment of the present general inventive concept.

Figure 2:
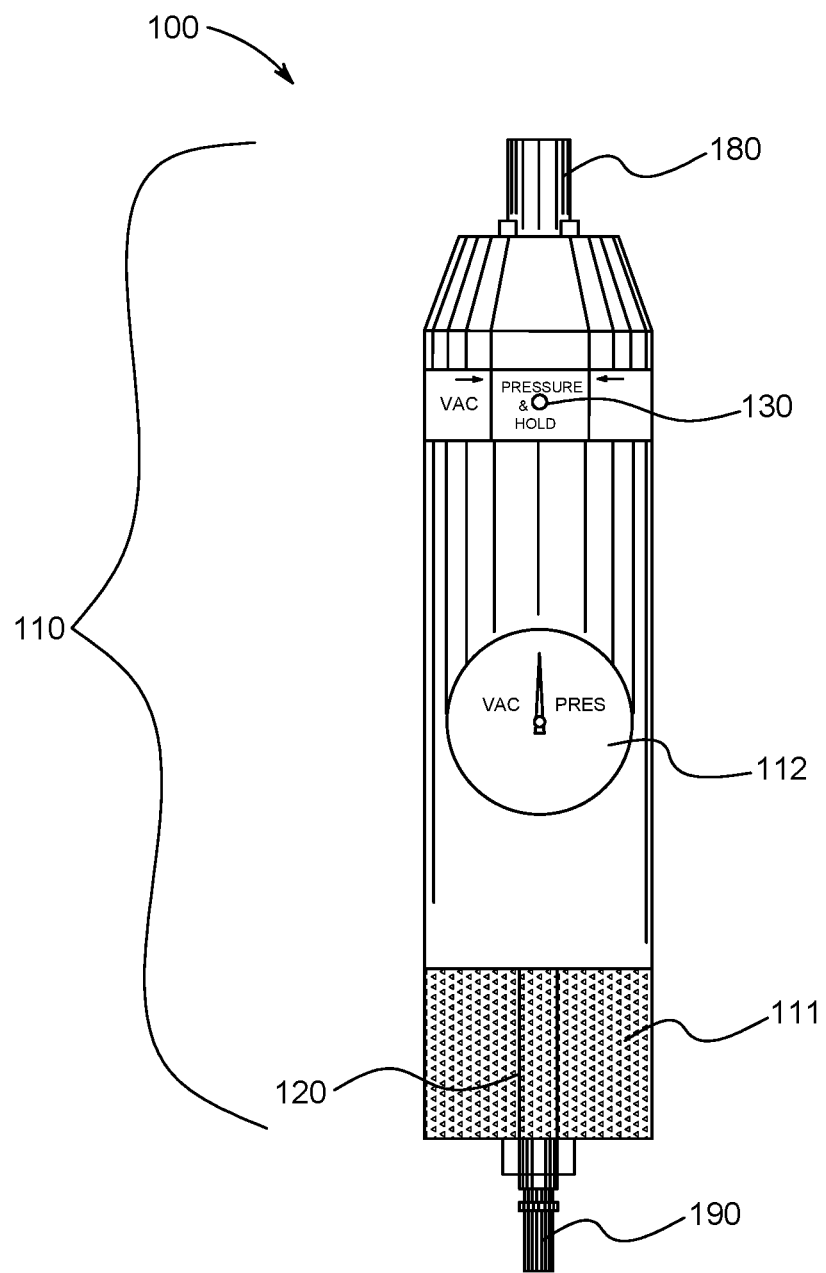
FIG. 2 illustrates a front view of the leaking tank testing device, according to an exemplary embodiment of the present general inventive concept.

FIG. 2 illustrates a front view of the leaking tank testing device 100, according to an exemplary embodiment of the present general inventive concept.

The leaking tank testing device 100 may be constructed from at least one of metal (e.g., aluminum), plastic, glass, and rubber, etc., but is not limited thereto.

The leaking tank testing device 100 may include a main body 110, a tubing system 120, a selector 130, a gauge port 140, a check valve 150, a vacuum monitor 160, a seal 170, a hose quick connector 180, and an air pressure quick connector 190, but is not limited thereto.

Referring to FIGS. 1A through 2, the main body 110 is illustrated to have a cylindrical shape. However, the main body 110 may be a rectangular prism, rectangular, circular, conical, pentagonal, hexagonal, octagonal, or any other shape known to one of ordinary skill in the art, but is not limited thereto.

The main body 110 may include an air pressure regulator 111 and a meter 112, but is not limited thereto.

The air pressure regulator 111 may be disposed on and/or within at least a portion of the main body 110. The air pressure regulator 111 may include a control valve to reduce pressure from contents, such as a liquid and/or a gas, received within the main body 110 from a tank container 10.

The meter 112 may be disposed on at least a portion of an outer surface of the main body 110 to display a current pressure level of a current mode of operation of the leaking tank testing device 100.

The tubing system 120 may include a main tube 121 and an intake tube 122, but is not limited thereto.

The tubing system 120 may be disposed within at least a portion of the main body 110. More specifically, the main tube 121 may be disposed within a center portion of the main body 110, at least partially along a length thereof. The main tube 121 may receive the contents therein from the tank container 10.

Additionally, the intake tube 122 may extend away from the main tube 121, and be disposed at least partially along the length of the main body 110 to protrude out therefrom.

The selector 130 may include a detent (e.g., a ratchet and pawl, or a spring-loaded ball bearing), but is not limited thereto.

The selector 130 may be rotatably disposed on the outer surface of the main body 110. The selector 130 may select the current mode of operation of the leaking tank testing device 100. Specifically, the selector 130 may be rotated in a first direction (i.e. clockwise) or a second direction (i.e. counterclockwise) to select a vacuum testing mode in a first position, and a pressure testing mode in a second position. The detent may prevent and/or resist further movement without manual manipulation of the selector 130. In other words, the detent may keep the selector 130 in place, after it has been set, such that the selector 130 does not automatically rotate.

The gauge port 140 may be disposed within at least a portion of the main body 110 and connected to the meter 112. The gauge port 140 may send at least a portion of the contents therethrough, such that the meter 112 may display the current pressure level within the tubing system 120.

The check valve 150 may be disposed within at least a portion of the main tube 121. The check valve 150 may prevent any back flow of the contents. In other words, the check valve 150 may prevent the contents from flowing in opposite directions.

The vacuum monitor 160 may be disposed near a first end of the main body 110. The vacuum monitor 160 may display a gradient in pressure between the contents in the tubing system 120 and an external pressure outside of the main body 110 in response to the selector 130 being moved to the vacuum testing mode. As such, a user may compare the current pressure level with a predetermined pressure level for normal operation. As such, if the current pressure level is less than the predetermined pressure level, then the tank container 10 may have a leak.

The seal 170 may be disposed near the first end of the main body 110. The seal 170 may prevent the contents from exiting the main tube 121. The seal 170 may cover at least a portion of the main tube 121 in response to the selector 130 being moved to the pressure testing mode. As such, the user may compare the current pressure level with the predetermined pressure level for normal operation. As such, if the current pressure level decreases, subsequent to pressure buildup in the tank container 10, the tank container 10 may have a leak.

The hose quick connector 180 may be disposed on the first end of the main body 110. Moreover, at least a portion of the intake tube 122 may be disposed within at least a portion of the hose quick connector 180. Also, the intake tube 122 may protrude within a portion of the hose quick connector 180. The hose quick connector 180 may be used to connect to a hose from the tank container 10. Furthermore, the intake tube 122 may receive the contents from the tank container 10, such that the intake tube 122 may transport the contents to the main tube 121.

The air pressure quick connector 190 may be disposed on a second end of the main body 110. The air pressure quick connector 190 may receive a safety coupler 20 to reduce pressure buildup within the tubing system 120 by extracting at least a portion of the contents therein. Furthermore, the check valve 150 may prevent the contents from flowing out the air pressure quick connector 190 unless the safety coupler 20 is connected thereto.

Therefore, the leaking tank testing device 100 may use at least two different methods for testing leaks on industrial holding tanks, hydraulic operating systems, bulldozers, and other heavy equipment. Additionally, the leaking tank testing device 100 may eliminate loss of the contents from the tank container 10 during testing.

The present general inventive concept may include a leaking tank testing device 100, including a main body 110, a tubing system 120 disposed within at least a portion of the main body 110 to receive contents therein from a tank container 10, a selector 130 rotatably disposed on an outer surface of the main body 110 to select a vacuum testing mode in a first position, and a pressure testing mode in a second position, a vacuum monitor 160 disposed on at least a portion of the main body 110 to display a gradient in pressure between the contents in the tubing system 120 and an external pressure outside of the main body 110 in response to the selector 130 being moved to the vacuum testing mode, and a seal disposed on at least a portion of the main body 110 to cover at least a portion of the tubing system 120 in response to the selector 130 being moved to the pressure testing mode.

The main body 110 may include an air pressure regulator 111 to reduce pressure from the contents, and a meter 112 to display a current pressure level of at least one of the vacuum testing mode and the pressure testing mode.

The selector 30 may include a detent to prevent automatic rotation of the selector 130.

The leaking tank testing device 100 may further include a check valve 150 to prevent the contents from flowing in opposite directions.

The leaking tank testing device 100 may further include a hose quick connector 180 disposed on a first end of the main body 110 to connect to a hose from the tank container 10.

The leaking tank testing device 100 may further include an air pressure quick connector 190 disposed on a second end of the main body 110 to receive a safety coupler 20 thereupon to reduce pressure buildup within the tubing system 120.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A leaking tank testing device, comprising:
   a main body;
   a tubing system disposed within at least a portion of the main body to receive contents therein from a tank container;
   a selector rotatably disposed on an outer surface of the main body to select a vacuum testing mode in a first position, and a pressure testing mode in a second position;
   a vacuum monitor disposed on at least a portion of the main body to display a gradient in pressure between the contents in the tubing system and an external pressure outside of the main body in response to the selector being moved to the vacuum testing mode; and
   a seal disposed on at least a portion of the main body to cover at least a portion of the tubing system in response to the selector being moved to the pressure testing mode.

2. The leaking tank testing device of claim 1, wherein the main body comprises:
   an air pressure regulator to reduce pressure from the contents; and
   a meter to display a current pressure level of at least one of the vacuum testing mode and the pressure testing mode.

3. The leaking tank testing device of claim 1, wherein the selector comprises:
   a detent to prevent automatic rotation of the selector.

4. The leaking tank testing device of claim 1, further comprising:
   a check valve to prevent the contents from flowing in opposite directions.

5. The leaking tank testing device of claim 1, further comprising:
   a hose quick connector disposed on a first end of the main body to connect to a hose from the tank container.

6. The leaking tank testing device of claim 1, further comprising:
   an air pressure quick connector disposed on a second end of the main body to receive a safety coupler thereupon to reduce pressure buildup within the tubing system.

\* \* \* \* \*